Patented Mar. 17, 1942

2,276,316

UNITED STATES PATENT OFFICE 2,276,316

EMULSIFYING AND FOAMING AGENTS AND PROCESS OF PRODUCING THEM

Henry R. Kraybill, Pearl H. Brewer, and Max Horsley Thornton, West Lafayette, Ind., assignors to Purdue Research Foundation, West Lafayette, Ind., a corporation of Indiana No Drawing. Application October 30, 1937, Serial No. 171,910

4 Claims. (Cl. 260—403)

It is the object of our invention to obtain emulsifying and foaming agents from soy-bean oil.

The present application is a continuation in part of our co-pending application Serial No. 122,218, filed January 25, 1937.

We have discovered that if relatively crude soy-bean oil is brought into intimate contact with an adsorbent material which has a greater affinity for phosphatides and mucilages than has the oil proper, as by being passed through a column of such an adsorbent material as through a filter, not only is a refining of the oil obtained with little or no loss of true fats, but in addition there is obtained as adsorbed material on the adsorbent agent certain material which is valuable as an emulsifying agent and which initially includes certain valuable phosphatides and mucilages. The phosphatides and mucilages and these other things are adsorbed on the adsorbent material in substantially unaltered condition, so that they may be recovered therefrom; while the oil, substantially freed by such adsorption from such phosphatides and mucilages and other things, is thereby obtained in a refined condition.

The adsorbed material—phosphatides, mucilages, sterols, sterol glucosides, free fatty acids, pigments, and various other compounds which are objectionable from the standpoint of the refined oil—may be and desirably are removed from the adsorbent material in suitable manner, in substantially unaltered condition, and separated one from another to any desirable extent, and the useful ones used for purposes for which they are adapted.

The adsorbent material may be of various types, so long as it has a sufficiently high affinity for phosphatides and mucilages that on intimate contact with the relatively crude soy-bean oil containing them it will adsorb those phosphatides and mucilages substantially completely. Two excellent adsorbing materials are the ones which are defined in the Brewer and Kraybill Patent No. 2,176,851, granted October 17, 1939, on the co-pending application of two of us. Brewer and Kraybill, Serial No. 121,573, filed January 21, 1937, and in the Kraybill, Brewer and Thornton Patent No. 2,174,177, granted September 26, 1939, on the application filed by all three of us, Serial No. 121,572, filed January 21, 1937; but while we believe that those are the best adsorbent materials so far available, our present invention in its generic aspect is not limited to any particular adsorbent material but may utilize any adsorbent material which meets the conditions we specify herein.

The adsorbent material described in said Brewer and Kraybill application Serial No. 121,573 is a silica foam which is prepared by passing carbon dioxide into a concentrated water solution of sodium silicate to produce a gel containing a carbonate, treating the gel so formed with an acid which reacts with the carbonate to liberate carbon dioxide and so to cause the gel to expand into a solid foam, washing the solid foam with water, and then drying that solid foam.

The adsorbent material described in said Kraybill, Brewer and Thornton application Serial No. 121,572 is a sodium aluminum silicate, especially prepared by mixing a water solution of sodium silicate with a water solution of an acid-reacting aluminum salt, to form a gelatinous precipitate, and keeping the amount of water present prior to the formation of such gelatinous precipitate sufficiently small so that almost but not quite all of it is taken up in the precipitate, mixing said precipitate with additional water in sufficient quantity to prevent the whole from forming a gel on standing, filtering to remove excess water, washing, and drying.

Either of these two adsorbent materials has the characteristic that a 20-gram lot of it is capable of adsorbing from 200 grams of a crude soy-bean oil of between 0.06% and 0.08% phosphorus content at least enough phosphorus-containing material to reduce the phosphorus content of the oil to one-third of its original value. That is the characteristic of those two adsorbent materials which makes them available as adsorbent materials for our process, and any adsorbent material which meets those conditions may be used—such for instance as Lloyd's reagent and certain other treated naturally occurring aluminum silicates, precipitated tricalcium phosphate, and some artificial zeolites.

In carrying out our invention in its preferred form, we form a filter column of the desired adsorbent material, and cause the substantially crude soy-bean oil which is to be refined, even such a crude oil as a soy-bean oil sludge, to be passed into the top of this filter column and the refined oil to be drawn off from the bottom thereof. The passage of the oil through the filter may be a natural gravity passage, or may be accelerated in any suitable way as by pressure and/or by suction. The oil which passes from such a filter column of a proper adsorbent material is an excellent grade of the soy-bean oil used, substantially free from the contaminants which are present in the natural oil and which are removed by the adsorbent material.

Instead of using a filter column of the adsorbent material, and passing through that column the substantially crude soy-bean oil to be refined, we may mix the adsorbent material with such oil, and agitate vigorously to produce thorough and intimate contact; and then separate the oil from the adsorbent material, which latter now has the contaminants adsorbed thereon. Such separation may, for instance, be by filtering or by centrifuging; or, although less effectively, even by decanting.

Ordinarily it is necessary to use the process only once to get the desired refining of the oil, and to use only room temperature, especially when the filter column is used. If desired, however, as because the adsorbent material may have become saturated, the process may be repeated one or more times; and the temperature may be raised above room temperature, as in order to reduce viscosity, but desirably not to a point high enough to produce deterioration of the adsorbed material.

The refined soy-bean oil which is thus obtained by adsorbing the contaminants out of it by an adsorbent material that has an affinity for phosphatides and mucilages, is suitable for most industrial purposes without further treatment. It is a non-break oil, even if the original oil was a break oil. It is substantially clear. It is substantially free not only from phosphatides and mucilages but also from the greater part of other originally present objectionable substances, such as sterol glucosides and free fatty acids. It is substantially free from red pigments, and usually has the amount of yellow pigments reduced. While it may still contain some sterols, the amount of sterols present in it is usually materially less than in the original oil. All of these things, some of which are valuable in themselves, are contaminants in a soy-bean oil; and the oil is improved by their removal. The refined oil is directly suitable as an edible oil, although sometimes a deodorizing treatment is still desirable.

When the adsorbent material approaches saturation, it is desirable to treat it to remove the adsorbed material therefrom, both so that the adsorbent material may be used again and so that the adsorbed material may be recovered.

The adsorbed material is most conveniently removed from the adsorbent material by extracting the latter with a suitable solvent, or with a succession of solvents. We usually extract it first with acetone, to extract any adherent oil; and the acetone also removes some of the sterols and sterol glucosides, which if present in the original oil were adsorbed with the phosphatides and mucilages. Next we usually extract it with ethyl ether, which removes the greater part of the adsorbed material, as a mixed solute. As a third solvent we preferably use anhydrous ethyl alcohol (99% to 99.5%), which takes up another mixed solute. Finally we extract the adsorbent material with dilute ethyl alcohol (between 20% and 70%), which is usually as far as we carry the treatment of the used adsorbent material. The adsorbent material may be re-used after being treated with some or all of this series of solvents.

The adsorbed material which is thus removed from the adsorbent material is in substantially unaltered condition, and by suitable processes of separation the various components may be obtained, in a purity dependent upon the extent of the separation, and used where they are commercially available.

While the process of removing the adsorbed material from the adsorbent material, and of separating the removed adsorbed material into its components, may be varied, in accordance with the nature of the original soy-bean oil and the nature of what it is desired to obtain, the following is an example of one process which has been found particularly effective.

a. The adsorbent material with the adsorbed material thereon is extracted with acetone, as already noted. The acetone is evaporated from the acetone extract, to leave as a residue the oil which the acetone had dissolved, with sterols and sterol glucosides in that oil. Some of the sterol glucosides precipitate upon the evaporation of the acetone; and those sterol glucosides are removed from the oil by filtration. The remaining oil, with such sterols and sterol glucosides as it may still contain, may then be passed again through the adsorbent material. If desired, however, such remaining oil may be suitably treated to remove sterols and/or sterol glucosides therefrom, before such oil is passed again through the adsorbent material; but that process of separating the sterols and/or sterol glucosides from the oil forms the subject-matter of another invention.

b. After having been extracted with acetone, the adsorbent material is extracted with ethyl ether, as has also been already noted. The ether extract may be subjected to evaporation, desirably in vacuum, to drive off the ether and to leave behind a very good grade of phosphatides. Instead of eliminating the ether from the ether extract, we may treat the ether extract, after concentrating it by evaporation if desired, with about four times its volume of acetone to precipitate the phosphatides; after which the supernatant liquid is suitably removed, as by filtering or centrifuging. With either way of obtaining the phosphatides substantially free of a solvent, we preferably dry the phosphatide residue, in vacuum or in an inert gas. This residue may be called fraction B. We may add a suitable oil or fat to make an oil or fat solution of this fraction B.

If the phosphatides were precipitated by the addition of acetone, and the supernatant liquid then removed, that supernatant liquid is desirably evaporated; upon which evaporation a gummy-like product remains which contains some sterol glucosides.

Instead of adding an oil or fat to the phosphatides (fraction B) obtained by evaporation of the ether or precipitation from the ether, we may extract such phosphatides (fraction B) with concentrated ethyl alcohol, of desirably at least 90% concentration. The alcohol dissolves part of the phosphatides, and leaves part undissolved; and the two are suitably separated, as by decanting, filtering, or centrifuging. The solid residue now remaining may be called fraction $B_1$—which is soluble in ether and insoluble in acetone and in anhydrous alcohol. The alcohol extract is subjected to evaporation to drive off the alcohol, which leaves the solute as a very viscous liquid. This may be called fraction $B_2$— which is substantially wholly soluble in ether, in acetone, and in anhydrous alcohol, and substantially insoluble in dilute alcohol. Thus the phosphatides are divided into two parts, one alcohol-soluble and the other alcohol-insoluble. Both fractions are rich in phosphatides, and both are excellent emulsifying agents, but the alcohol-soluble fraction is much better than the alcohol-insoluble fraction as an emulsifying agent and is soluble in acetone.

c. After having extracted the adsorbent material with acetone and with ether, we next extract it with concentrated ethyl alcohol, desirably anhydrous (about 99% to 99.5%). This alcohol extract is subjected to evaporation, desirably under vacuum; and the residue from that alcohol extraction is extracted with ether, and the whole subjected to filtering or centrifuging to separate the liquid from the solids. The solids consist largely of crystalline sterol glucosides. The liquid is subjected to evaporation, desirably under vacuum, to leave a residue, which we may call fraction C, which is a highly purified grade of phosphatides, substantially wholly soluble in ether and in anhydrous alcohol and substantially insoluble in acetone and in dilute alcohol.

d. After the adsorbent reagent has been extracted as aforesaid successively with acetone, ether, and anhydrous alcohol, it is then extracted with dilute alcohol (about 20% to 70%). The dilute-alcohol extract is subjected to evaporation. The evaporation may be continued until substantially all the alcohol and water have been driven off, which leaves as a residue a good emulsifying or foaming agent; which may be called fraction D. This is soluble in dilute alcohol of between 20% and 70% alcohol concentration, capable of forming a colloidal suspension in water, and soluble in water solutions of an alkali to form a solution from which it may be precipitated by the addition of either hydrochloric or sulfuric acid.

Instead of obtaining this fraction D as a whole, it may be obtained as two sub-fractions $D_1$ and $D_2$. To that end, the evaporation to drive off alcohol and water may be continued only until the volume is reduced to about one-fourth of the original, when it is found that there is a floating gummy residue, which may be called fraction $D_1$. That gummy residue (fraction $D_1$) is skimmed off, is practically insoluble in water, is soluble in ether, in acetone, in benzene, and in toluene, is soluble in water solutions of an alkali to form solutions from which it may be precipitated by the addition of either hydrochloric or sulfuric acid, and is a good emulsifying and foaming agent.

After the gummy residue has been skimmed off, the remaining solution is evaporated to small volume, almost to dryness, and an excess of acetone is added. This produces a precipitate, which may be called fraction $D_2$. This is suitably separated, as by filtration, and dried to free it from acetone. The product thus obtained (fraction $D_2$) is soluble in water and in dilute alcohol, and practically insoluble in ether, in absolute alcohol, in acetone, and in benzene. It is a good emulsifying and foaming agent. It is soluble in water solutions of an alkali, and is precipitated from said alkali solutions and from water solutions, probably as an acid, by the addition of either hydrochloric or sulfuric acid.

Claims directed specifically to the B and C fractions, and to the specific processes of obtaining them, and also certain generic claims, are presented in our co-pending application Serial No. 171,984, of even filing date herewith.

We claim as our invention:

1. An emulsifying and foaming agent, derived by extraction from soy-bean oil, and soluble in water solutions of an alkali to form a solution from which a precipitate may be obtained by the addition of either hydrochloric or sulfuric acid.

2. An emulsifying and foaming agent, derived by extraction from soy-bean oil, soluble in dilute alcohol of between 20% and 70% alcohol concentration, capable of forming a colloidal suspension in water, and soluble in water solutions of an alkali to form a solution from which it may be precipitated by the addition of either hydrochloric or sulfuric acid.

3. An emulsifying and foaming agent, derived by extraction from soy-bean oil, practically insoluble in water, soluble in ether, in acetone, in benzene, and in toluene, and soluble in water solutions of an alkali to form a solution from which it may be precipitated by the addition of either hydrochloric or sulfuric acid.

4. An emulsifying and foaming agent, derived by extraction from soy-bean oil, soluble in water and in dilute alcohol, practically insoluble in ether, in absolute alcohol, in acetone, and in benzene, and precipitable from water solution by the addition of either hydrochloric or sulfuric acid.

HENRY R. KRAYBILL.
PEARL H. BREWER.
MAX HORSLEY THORNTON.